(12) United States Patent
Sung et al.

(10) Patent No.: US 10,631,699 B2
(45) Date of Patent: Apr. 28, 2020

(54) ROBOT CLEANER

(71) Applicant: LG ELECTRONICS INC., Seoul (KR)

(72) Inventors: Jihoon Sung, Seoul (KR); Bongju Kim, Seoul (KR); Hyungsuk Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 154 days.

(21) Appl. No.: 15/737,650

(22) PCT Filed: Jul. 12, 2016

(86) PCT No.: PCT/KR2016/007542
§ 371 (c)(1),
(2) Date: Dec. 18, 2017

(87) PCT Pub. No.: WO2017/018691
PCT Pub. Date: Feb. 2, 2017

(65) Prior Publication Data
US 2018/0192842 A1 Jul. 12, 2018

(30) Foreign Application Priority Data
Jul. 28, 2015 (KR) .................. 10-2015-0106483

(51) Int. Cl.
*A47L 9/22* (2006.01)
*A47L 9/00* (2006.01)
(Continued)

(52) U.S. Cl.
CPC .............. *A47L 9/22* (2013.01); *A47L 9/009* (2013.01); *A47L 9/2805* (2013.01);
(Continued)

(58) Field of Classification Search
CPC .......... A47L 9/22; A47L 9/009; A47L 9/2805; A47L 9/2842; A47L 9/2852;
(Continued)

(56) References Cited

U.S. PATENT DOCUMENTS 6,189,808 B1 * 2/2001 Daniels ................ B60S 1/0822
15/250.002
2005/0022485 A1 2/2005 Park et al.
(Continued)

FOREIGN PATENT DOCUMENTS

| DE | 10-2011-054706 | 9/2012 |
|----|----------------|--------|
| GB | 2 404 438 | 2/2005 |

(Continued)

OTHER PUBLICATIONS

Korean Office Action dated May 13, 2016 issued in Application No. 10-2015-0106483 (with English translation).
(Continued)

*Primary Examiner* — Robert J Scruggs
(74) *Attorney, Agent, or Firm* — Ked & Associates, LLP

(57) ABSTRACT

A robot cleaner is disclosed. The robot cleaner includes a main body defining an outer appearance thereof, a suction device mounted inside the main body and including a suction motor and a suction fan, a suction port for sucking foreign substances from a floor upon operation of the suction device, a dust collection device for collecting foreign substances from air sucked through the suction port, one or more wheels for enabling the main body to travel autonomously, and a control unit for controlling the operation of the suction device and the wheels. The suction motor includes a stator and a rotor disposed around the stator and formed to be rotated with a rotating shaft. The rotor includes a first magnet for rotating the rotor around the stator, and a second magnet for preventing the rotating shaft of the
(Continued)

suction motor from moving axially within a range of end play.

15 Claims, 6 Drawing Sheets

(51) Int. Cl.
*A47L 9/28* (2006.01)
*H02K 7/14* (2006.01)
*H02K 21/22* (2006.01)
*H02K 7/09* (2006.01)

(52) U.S. Cl.
CPC .......... *A47L 9/2842* (2013.01); *A47L 9/2852* (2013.01); *H02K 7/14* (2013.01); *H02K 21/22* (2013.01); *A47L 2201/04* (2013.01); *A47L 2201/06* (2013.01); *H02K 7/09* (2013.01)

(58) Field of Classification Search
CPC ... A47L 2201/04; A47L 2201/06; H02K 7/14; H02K 21/22; H02K 7/09
See application file for complete search history.

(56) References Cited

U.S. PATENT DOCUMENTS

| | | | |
|---|---|---|---|
| 2011/0073142 A1* | 3/2011 | Hattori | B60S 1/0848 134/56 R |
| 2011/0289960 A1* | 12/2011 | Cho | F04B 39/0094 62/498 |
| 2014/0257565 A1 | 9/2014 | Sun et al. | |
| 2014/0312813 A1* | 10/2014 | Murchie | A47L 9/2842 318/400.03 |
| 2015/0027494 A1 | 1/2015 | Ryu et al. | |
| 2015/0198952 A1* | 7/2015 | Einecke | G05D 1/0225 134/6 |
| 2016/0081523 A1* | 3/2016 | Kim | A47L 9/1625 15/353 |
| 2016/0154566 A1* | 6/2016 | Rakic | G06F 3/0488 715/810 |
| 2016/0166127 A1* | 6/2016 | Lewis | A47L 9/02 15/49.1 |

FOREIGN PATENT DOCUMENTS

| | | |
|---|---|---|
| JP | 2003-323214 | 11/2003 |
| JP | 2013/000302 | 1/2013 |
| KR | 10-2008-0044933 | 5/2008 |
| KR | 10-2009-0006821 | 1/2009 |
| KR | 10-2010-0138099 | 12/2010 |
| KR | 10-2013-0020062 | 2/2013 |
| KR | 10-2014-0109178 | 9/2014 |
| TW | I486142 | 6/2015 |
| TW | 201528655 | 7/2015 |

OTHER PUBLICATIONS

International Search Report dated Oct. 20, 2016 issued in Application No. PCT/KR2016/007542 (full English text).
Written Opinion dated Oct. 20, 2016 issued in Application No. PCT/KR2016/007542 (full English text).
Taiwanese Office Action dated Sep. 28, 2017 issued in Application No. 105122904 (with English translation).
International Preliminary Report on Patentability dated Jan. 30, 2018 issued in Application No. PCT/KR2016/007542 (full English text).
European Search Report dated Feb. 25, 2019 issued in Application No. 16830724.7.
Australian Examination Report dated Jun. 7, 2018 issued in Application No. 2016301082.

* cited by examiner

[Fig. 1]
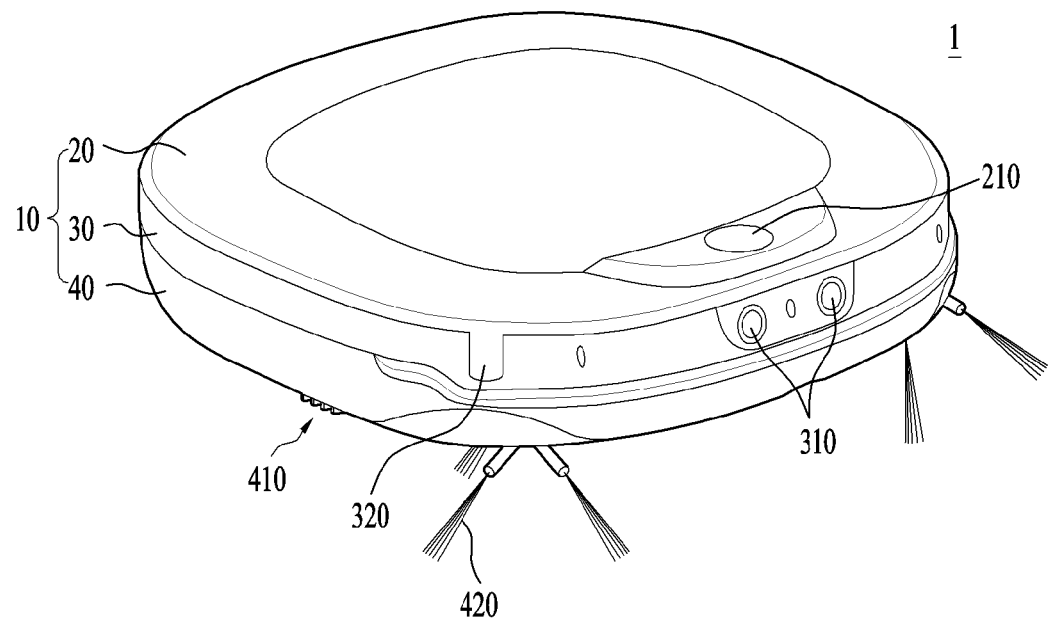
[Fig. 2]
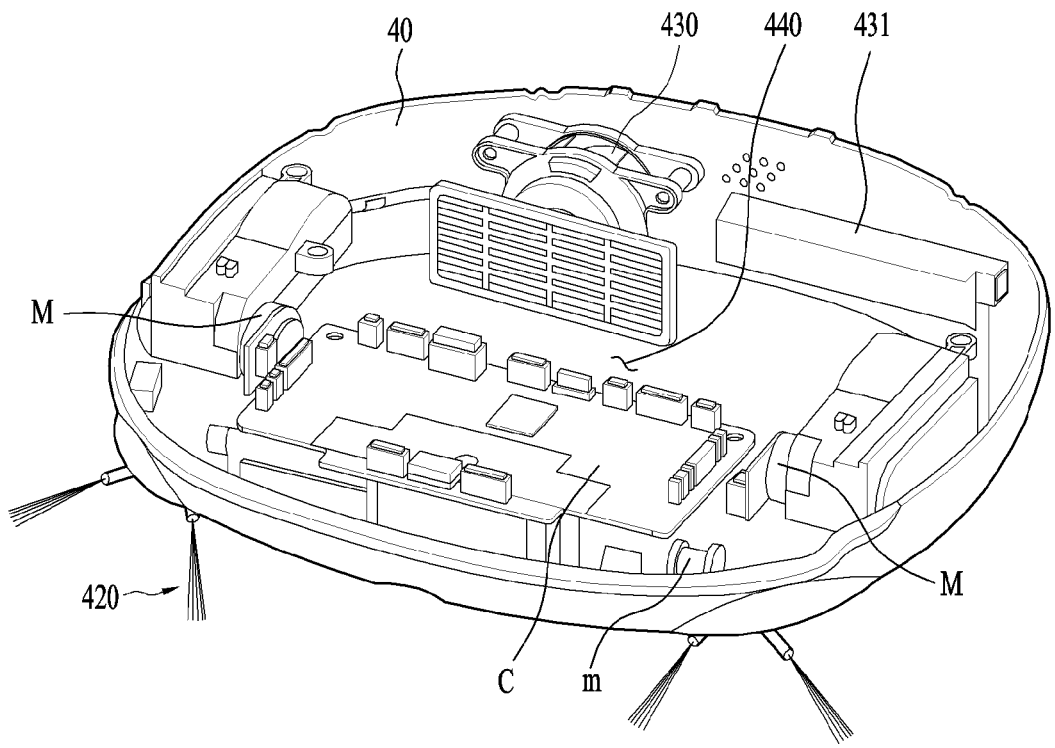

[Fig. 3]
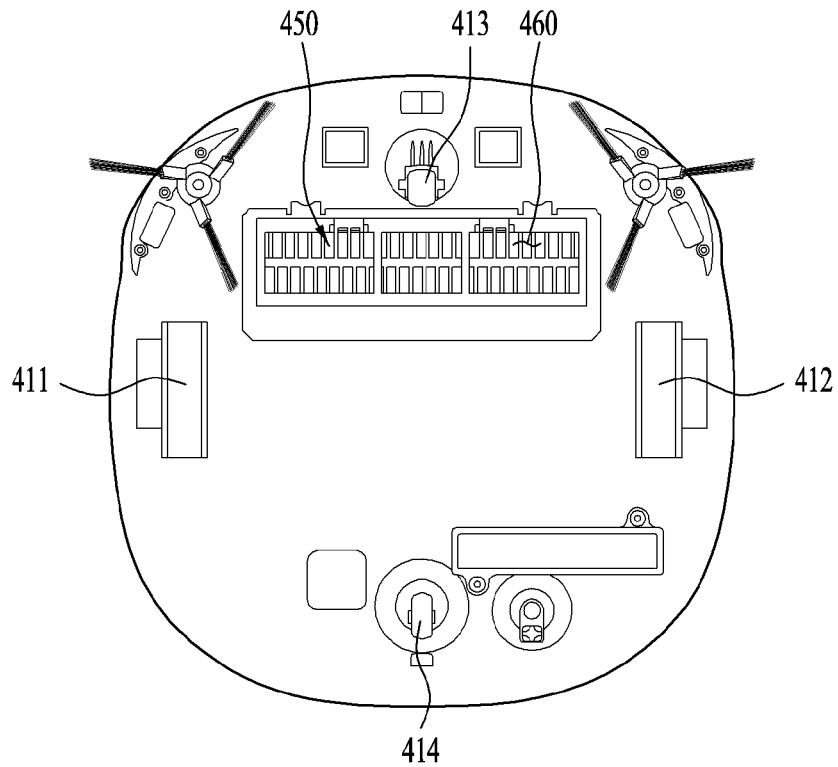
[Fig. 4]
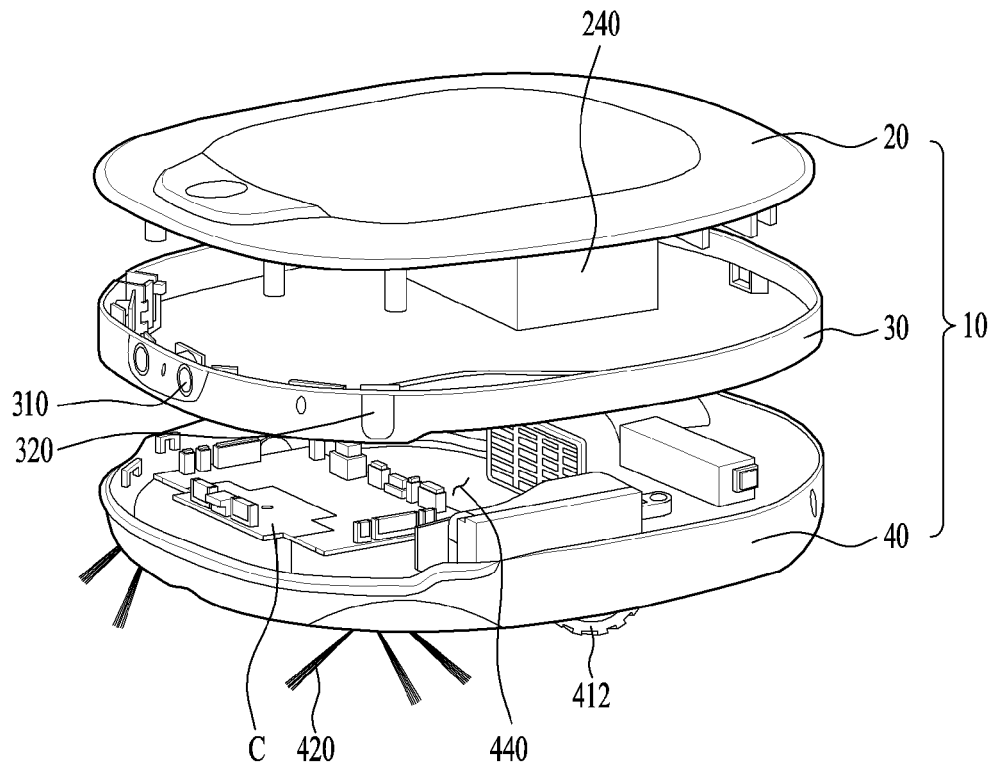

[Fig. 5]
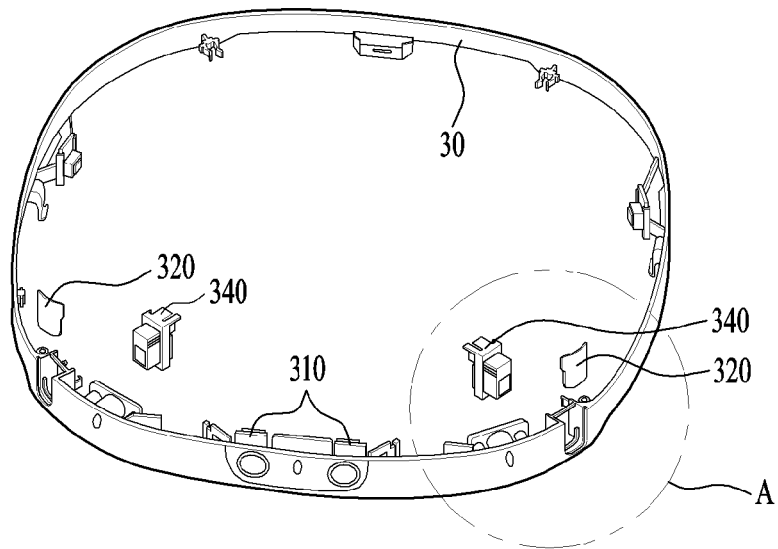
[Fig. 6]
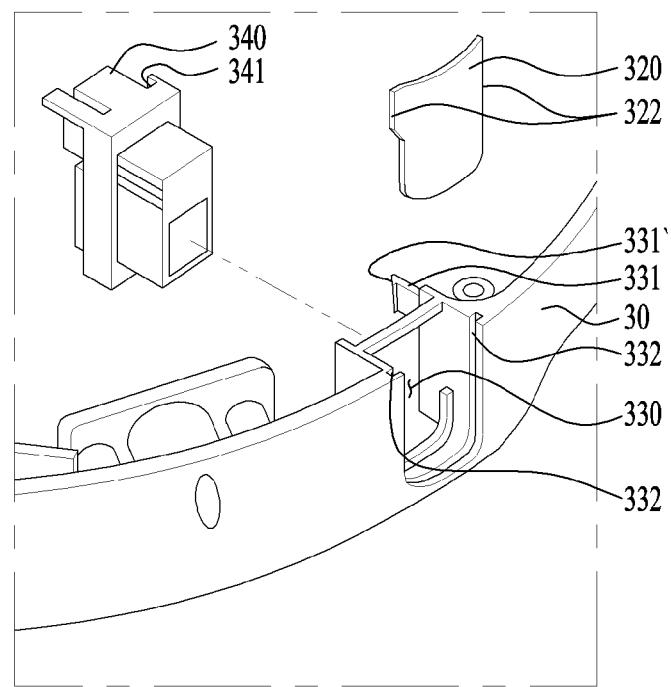

[Fig. 7]
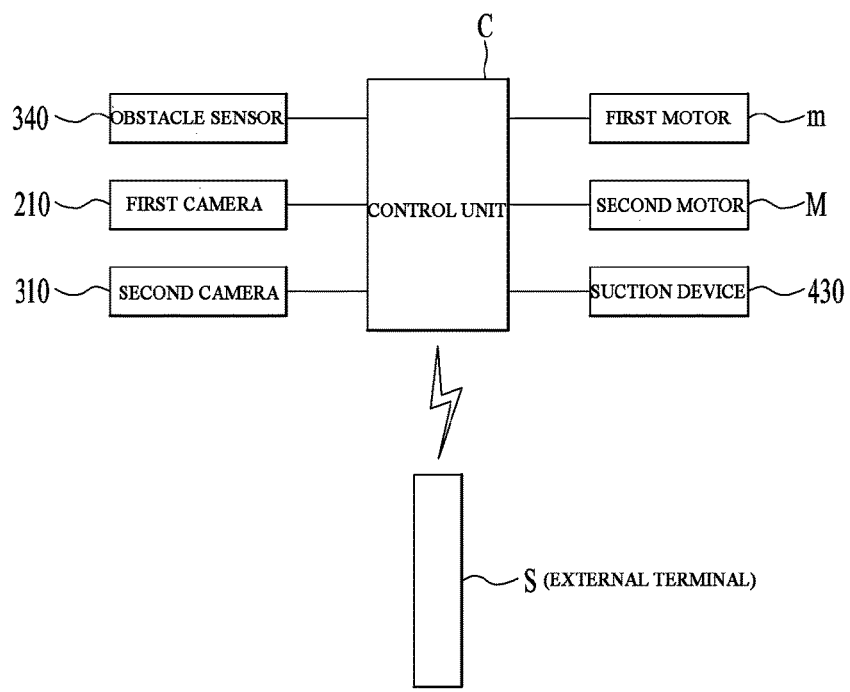
[Fig. 8]
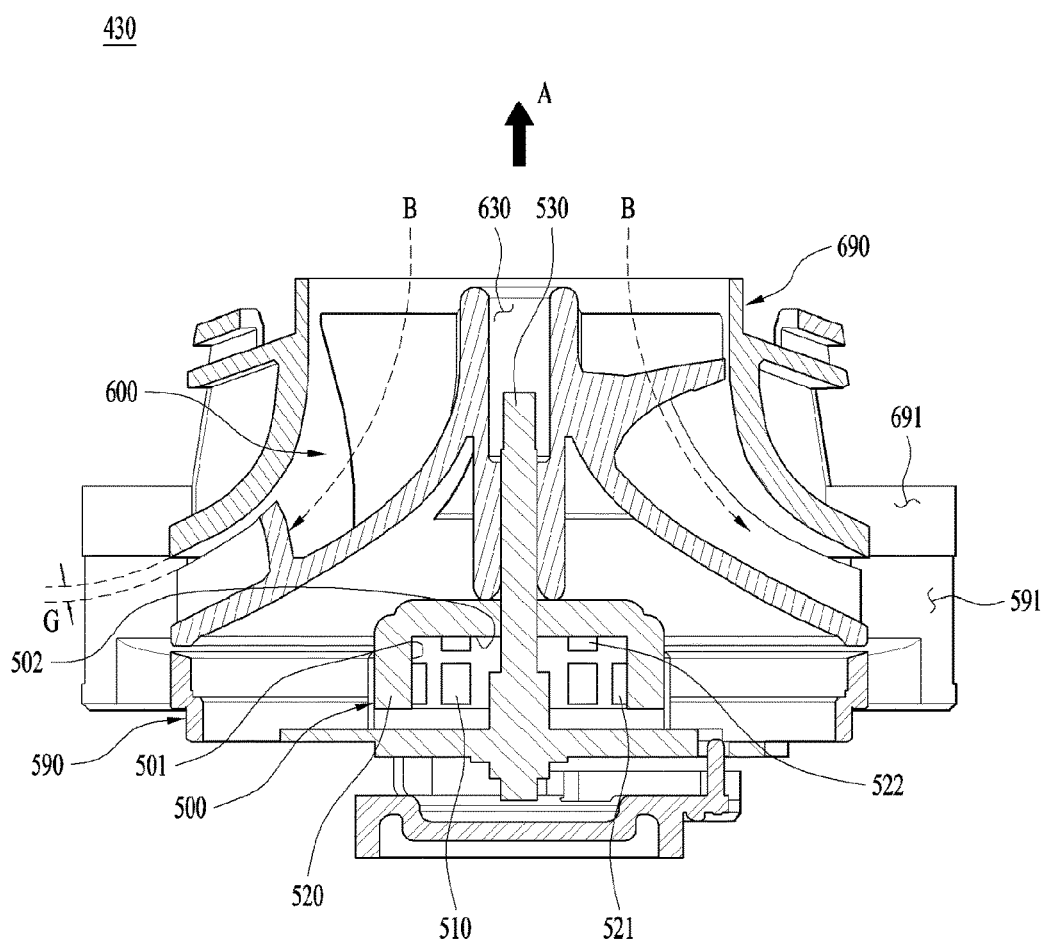

[Fig. 9]
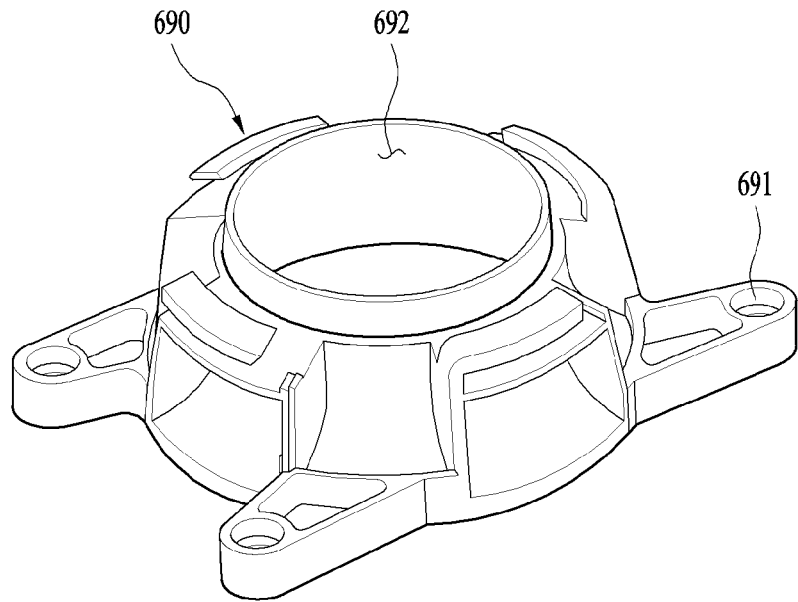
(a)
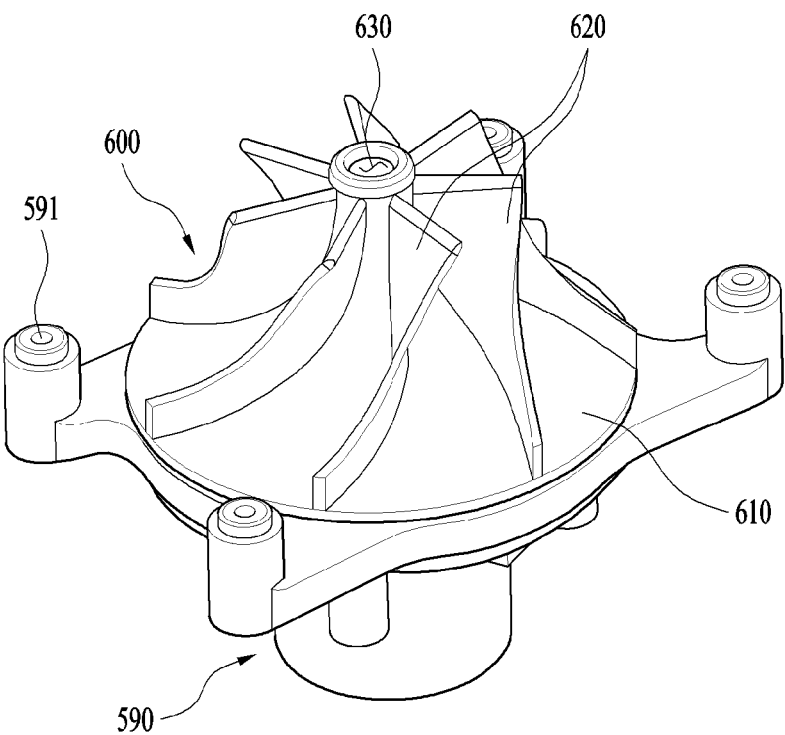
(b)

[Fig. 10]
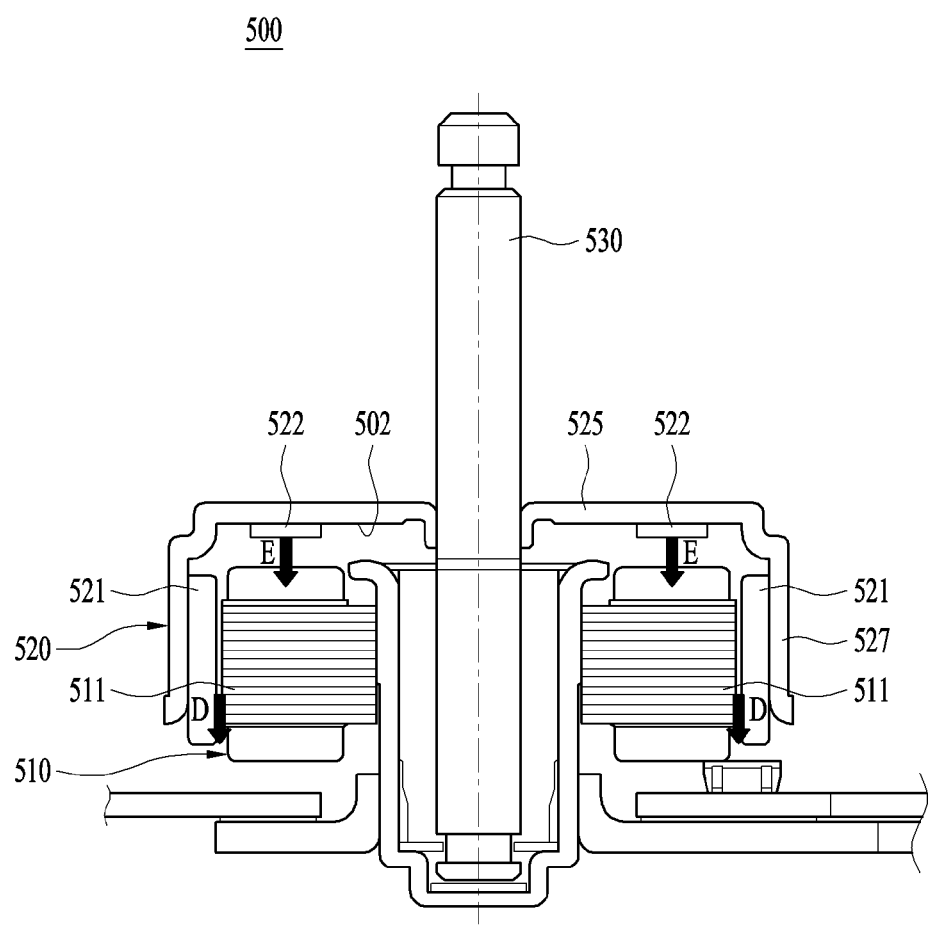

ROBOT CLEANER

CROSS-REFERENCE TO RELATED PATENT APPLICATIONS

This application is a U.S. National Stage Application under 35 U.S.C. § 371 of PCT Application No. PCT/KR2016/007542, filed Jul. 12, 2016, which claims priority to Korean Patent Application No. 10-2015-0106483, filed Jul. 28, 2015, whose entire disclosures are hereby incorporated by reference.

TECHNICAL FIELD

The present invention relates to a robot cleaner, and more particularly, to a robot cleaner that is capable of reducing the dispersion of suction force by preventing a rotating shaft from moving axially within the range of end play while a fan of a suction device rotates.

Further, the present invention relates to a robot cleaner that is capable of preventing an obstacle sensor from malfunctioning and improving the precision of obstacle detection.

BACKGROUND ART

In general, a vacuum cleaner is an appliance for cleaning floors, carpets placed on floors, or the like by sucking air containing foreign substances using an air suction device, which includes a motor and a fan mounted inside the main body of the cleaner in order to generate air suction force, removing and collecting the foreign substances from the sucked air, and discharging purified air, from which the foreign substances have been removed, outside the main body of the cleaner.

Such a vacuum cleaner may be classified into a manual vacuum cleaner, which is directly manipulated by a user, and a robot cleaner, which performs cleaning autonomously without a user's manipulation.

The robot cleaner comprises a suction device mounted therein, which includes a motor and a fan. Because the size of the robot cleaner is limited, the size of the motor is also limited. That is, only a small motor may be mounted inside the robot cleaner.

Upon rotation of the fan, the rotating shaft of the small motor may move axially (that is, in the forward and rearward direction of the motor) a predetermined distance due to the thrust generated by the rotation of the fan. That is, the rotating shaft of the small motor may move axially a predetermined distance within the range of end play.

However, if the rotating shaft of the motor moves axially within the range of end play upon rotation of the fan, the distance between the fan and a cover mounted in front of the fan may be changed, which causes the dispersion of suction force.

The robot cleaner autonomously travels in an area to be cleaned, and sucks foreign substances such as, for example, dust from the floor. In addition, the robot cleaner may include various sensors (for example, an obstacle sensor) in order to avoid obstacles or walls located within the working area.

The obstacle sensor may be configured to emit infrared light and receive the infrared light reflected from an object, thereby measuring the distance to obstacles or walls located ahead of the sensor. That is, the obstacle sensor may include an infrared sensor.

For instance, the infrared sensor may include a light-emitting unit (a transmission unit) and a light-receiving unit (a reception unit), and may enable measurement of the distance between the infrared sensor and an obstacle located ahead of the infrared sensor using the time taken for the infrared light emitted from the light-emitting unit to be received by the light-receiving unit after being reflected from the obstacle.

The obstacle sensor is exposed to direct solar radiation, which progresses toward the obstacle sensor from outside the robot cleaner.

However, if the obstacle sensor receives direct solar radiation (for example, visible light) other than the light emitted from the light-emitting unit of the infrared sensor, there is a high probability of the obstacle sensor malfunctioning.

In order to solve this problem, it may be considered to form the outer surface of the robot cleaner, which covers the obstacle sensor, using a material that allows only infrared light to pass therethrough. However, there is a problem in that such a material, which allows only infrared light to pass therethrough, is more expensive than a commonly used plastic material.

Further, if the material that allows only infrared light to pass therethrough is scratched, there is a problem in that the obstacle sensor cannot accurately receive the light (that is, infrared light) incident thereon.

In other words, a scratch formed on the surface of a material that allows only infrared light to pass therethrough may cause a malfunction of the obstacle sensor.

DISCLOSURE OF INVENTION

Technical Problem

An object of the present invention devised to solve the problem lies on a robot cleaner, which is capable of preventing a rotating shaft of a suction motor from moving axially within the range of end play.

Another object of the present invention devised to solve the problem lies on a robot cleaner, which is capable of reducing the dispersion of suction force of a suction device by preventing the axial movement of a rotating shaft of a suction motor.

A further object of the present invention devised to solve the problem lies on a robot cleaner, which includes a sensor cover that is capable of allowing only infrared light of direct solar radiation incident thereon from outside the robot cleaner to pass therethrough.

Another further object of the present invention devised to solve the problem lies on a robot cleaner, in which the sensor cover, which allows only infrared light to pass therethrough, is disposed in front of the obstacle sensor, thereby preventing the obstacle sensor from malfunctioning.

Still another further object of the present invention devised to solve the problem lies on a robot cleaner, in which the sensor cover is formed to have a size corresponding to the size of the obstacle sensor, thereby reducing manufacturing costs.

Still another further object of the present invention devised to solve the problem lies on a robot cleaner, in which the sensor cover is removably mounted to a main body of the robot cleaner, thereby facilitating maintenance of the sensor cover.

Still another further object of the present invention devised to solve the problem lies on a robot cleaner, which is capable of preventing scratches from being formed on the surface of the sensor cover through UV coating treatment of the surface of the sensor cover and suitable arrangement of the sensor cover.

Solution to Problem

The object of the present invention can be achieved by providing a robot cleaner including a main body defining an outer appearance thereof, a suction device mounted inside the main body and including a suction motor and a suction fan, a suction port for sucking foreign substances from a floor upon operation of the suction device, a dust collection device for collecting the foreign substances from air sucked through the suction port, one or more wheels for enabling the main body to travel autonomously, and a control unit for controlling operation of the suction device and the wheels, in which the suction motor includes a stator and a rotor disposed around the stator and formed to be rotated with a rotating shaft, and the rotor includes a first magnet for rotating the rotor around the stator, and a second magnet for preventing the rotating shaft of the suction motor from moving axially within a range of end play.

The first magnet and the second magnet may be provided independently from each other in the rotor, and the rotor may have a first mounting surface for mounting the first magnet thereto and a second mounting surface for mounting the second magnet thereto, the first mounting surface and the second mounting surface being arranged perpendicular to each other.

The rotor may include a front plate formed to allow the rotating shaft to be forcibly fitted thereinto and a cylindrical-shaped side plate extending from the front plate, and the first magnet may be disposed on the side plate and the second magnet may be disposed on the front plate.

The second magnet may be mounted to the front plate at a position corresponding to the stator coil of the stator while opposing the stator.

The rotating shaft may be applied with force directed in a rearward direction of the suction motor due to electromagnetic force generated between the second magnet and the stator coil of the stator.

A direction of thrust applied to the rotating shaft upon rotation of the suction fan may be opposite to a direction of first restoring force applied to the rotating shaft due to electromagnetic force between the first magnet and the stator coil and may be opposite to a direction of second restoring force applied to the rotating shaft due to electromagnetic force between the second magnet and the stator coil.

The thrust may be less than or equal to a sum of the first restoring force and the second restoring force.

At least one of a size and a number of the second magnet may be determined such that the second restoring force between the second magnet and the stator coil is greater than or equal to a value calculated by subtracting the first restoring force from the thrust.

The robot cleaner may further include a fan cover mounted in front of the suction fan and having a guide hole formed to guide air to flow toward the suction fan, and a distance between an inner circumferential surface of the fan cover and a free end portion of the suction fan facing the inner circumferential surface of the fan cover may be maintained at a predetermined distance irrespective of rotation of the suction fan.

The main body may include an upper housing and a lower housing, which are coupled to each other, and a side body interposed between the upper housing and the lower housing to surround a side portion of the main body, the side body being mounted with one or more obstacle sensors, and one or more sensor covers may be removably mounted to the side body at positions corresponding to the one or more obstacle sensors.

Each of the sensor covers may have a height less than or equal to a height of the side body, and may have a width less than or equal to one-twentieth of a circumference of the side body.

The side body and the sensor covers may be formed of different materials from each other.

The side body and the sensor covers may be manufactured separately, and the sensor covers may be removably mounted to the side body at positions in front of the obstacle sensors.

Each of the obstacle sensors may include an infrared sensor, and the sensor covers may be formed of polycarbonate so as to block light other than infrared light.

At least one surface of each of the sensor covers may be treated with UV coating.

In another aspect of the present invention, provided herein is a robot cleaner including a main body defining an outer appearance thereof, a suction device for sucking external foreign substances through a suction port and including a suction motor and a suction fan, and one or more wheels for enabling the main body to travel autonomously, in which the suction motor includes a stator having a stator coil and a cylindrical-shaped rotor formed to be rotated with a rotating shaft around the stator, the rotor has a side plate for mounting a first magnet thereto and a front plate for mounting a second magnet thereto, and a direction of thrust applied to the rotating shaft of the suction motor upon rotation of the suction fan is opposite to a direction of first restoring force generated by electromagnetic force between the first magnet and the stator coil and is opposite to a direction of second restoring force generated by electromagnetic force between the second magnet and the stator coil.

The thrust may be less than or equal to a sum of the first restoring force and the second restoring force.

Advantageous Effects of Invention

According to the present invention, a robot cleaner may be capable of preventing the rotating shaft of a suction motor from moving axially within the range of end play.

In addition, according to the present invention, the robot cleaner may be capable of reducing the dispersion of suction force by preventing the axial movement of the rotating shaft of the suction motor.

In addition, according to the present invention, the robot cleaner may include a sensor cover that is capable of allowing only infrared light of direct solar radiation incident thereon from outside the robot cleaner to pass therethrough.

In addition, according to the present invention, the sensor cover allowing only infrared light to pass therethrough may be disposed in front of the obstacle sensor, thereby preventing the obstacle sensor from malfunctioning.

In addition, according to the present invention, the sensor cover may be formed to have a size corresponding to the size of the obstacle sensor, thereby reducing manufacturing costs.

In addition, according to the present invention, the sensor cover may be removably mounted to a main body of the robot cleaner, thereby facilitating maintenance of the sensor cover.

In addition, according to the present invention, the robot cleaner may be capable of preventing scratches from being formed on the surface of the sensor cover through UV coating treatment of the surface of the sensor cover and suitable arrangement of the sensor cover.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 1 illustrates a perspective view of a robot cleaner according to an embodiment of the present invention;

FIG. 2 illustrates a view of the internal constitution of the robot cleaner according to the embodiment of the present invention;

FIG. 3 illustrates a view of the bottom of the robot cleaner according to the embodiment of the present invention;

FIG. 4 illustrates an exploded perspective view of the robot cleaner according to the embodiment of the present invention;

FIG. 5 illustrates a perspective view of a side body of the robot cleaner according to the embodiment of the present invention;

FIG. 6 illustrates an enlarged view of portion A in FIG. 5;

FIG. 7 illustrates a block diagram of components connected with a control unit of the present invention;

FIG. 8 illustrates a schematic sectional view of a suction device mounted inside the robot cleaner depicted in FIG. 1;

FIG. 9 illustrates perspective views respectively showing a suction motor and a fan cover of the suction device; and FIG. 10 illustrates a view showing the motor of the suction device depicted in FIG. 8 in detail.

MODE FOR THE INVENTION

Hereinafter, a robot cleaner according to one embodiment of the present invention will be described in detail with reference to the accompanying drawings. It is to be understood that the accompanying drawings which illustrate the exemplary configuration of the present invention is merely given for more detailed description of the present invention and is not intended to limit the technical scope of the present invention.

In addition, the same or similar elements are denoted by the same reference numerals even though they are depicted in different drawings and a repeated description thereof will be omitted. For convenience of description, in the drawings, sizes and shapes of respective constituent members may be exaggerated or reduced.

FIG. 1 illustrates a perspective view of a robot cleaner according to an embodiment of the present invention, FIG. 2 illustrates a view of the internal constitution of the robot cleaner according to the embodiment of the present invention, FIG. 3 illustrates a view of the bottom of the robot cleaner according to the embodiment of the present invention, and FIG. 4 illustrates an exploded perspective view of the robot cleaner according to the embodiment of the present invention.

Referring to FIGS. 1 to 4, a robot cleaner 1 according to an embodiment of the present invention may include a main body 10 defining the outer appearance thereof, a suction device 430 provided inside the main body, a suction port 460 formed to suck foreign substances from a floor upon operation of the suction device 430, a dust collection device 240 (refer to FIG. 4) for collecting foreign substances from the air sucked through the suction port 460, one or more wheels 411, 412, 413 and 414 provided to enable the main body 10 to travel, and a control unit C configured to control the operation of the suction device 430 and the one or more wheels 411, 412, 413 and 414.

The main body 10 may include an upper housing 20 and a lower housing 40, which are formed to be coupled to each other, and may further include a side body 30, which is interposed between the upper housing 20 and the lower housing 40.

As an example, the main body 10 may be formed such that the overall width is greater than the overall height. When viewed from above, the main body 10 may be formed to have a substantially circular shape or a substantially rectangular shape having rounded corners.

The main body 10 according to the present invention may have four corners, each of which is rounded with a predetermined radius of curvature. In addition, the main body 10 may have a front edge, a rear edge, and two side edges extending therebetween, each of which is rounded with a predetermined radius of curvature. The radius of curvature of each edge may be greater than the radius of curvature of each corner.

A first camera 210, for capturing images of the region above the robot cleaner 1, may be mounted to the upper housing 20. The first camera 210 may be configured to capture images of the ceiling. Based on the images of the ceiling captured by the first camera 210, the control unit C may detect the current position of the robot cleaner 1, which will be described later.

Since technologies related to detection of the position of the robot cleaner 1 through image capture are already well known in the art, a detailed explanation thereof will be omitted.

The suction device 430 may include a motor and a fan, which will be described later. Foreign substances on the floor may be drawn into the main body 10 upon operation of the suction device 430.

The suction port 460 may be formed to suck foreign substances from the floor into the main body upon operation of the suction device 430. That is, the suction port 460 may serve as an introduction port, through which external air and foreign substances are introduced into the main body 10.

As an example, the suction port 460 may be formed in the bottom surface of the main body 10. More particularly, the suction port 460 may be formed in the bottom surface of the lower housing 40. In addition, the suction port 460 may be located at a position ahead of the suction device 430. Accordingly, when the suction device 430 operates, foreign substances on the floor may be introduced into the main body 10 through the suction port 460.

A battery 431, for supplying electric power to the suction device 430, may be provided inside the main body 10.

The dust collection device 240 (refer to FIG. 4) may be configured to collect foreign substances from the air sucked through the suction port 460. That is, when the external air and foreign substances on the floor are sucked together through the suction port 460 by the operation of the suction device 430, the dust collection device 240 may collect the foreign substances.

As an example, the dust collection device 240 may be disposed between the suction port 460 and the suction device 430. In addition, the dust collection device 240 may be formed to allow the suction port 460 and the suction device 430 to communicate with each other. Further, the dust collection device 240 may include a filter (not illustrated).

Accordingly, the air introduced into the main body through the suction port 460 may pass sequentially through the dust collection device 240 and the suction device 430, and may be then discharged outside. During this process, foreign substances included in the air may be collected in the dust collection device 240.

In the embodiment of the present invention, the dust collection device 240 may be removably mounted to the bottom surface of the upper housing 20. In addition, the lower housing 40 may be formed with a space 440 for accommodating the dust collection device 240 therein.

Therefore, when the upper housing 20 and the lower housing 40 are coupled to each other, the dust collection device 240 may be accommodated in the space 440 formed in the lower housing 40.

A first brush assembly 450 (refer to FIG. 3) may be provided at a position corresponding to the suction port 460 inside the main body 10. For example, the first brush assembly 450 may include a rotating shaft and a plurality of brushes provided on the circumference of the rotating shaft.

The rotating shaft of the first brush assembly 450 may be arranged to extend in the width direction of the main body 10, and the brushes may be arranged to extend outward from the circumference of the rotating shaft in the radial direction of the rotating shaft. Accordingly, foreign substances on the floor may be gathered by rotation of the first brush assembly 450, and may thus be easily sucked into the suction port 460.

A first motor m, for rotating the first brush assembly 450, may be provided inside the main body 10. The first brush assembly 450 may be rotated by operation of the first motor m, which is controlled by the control unit C.

In the embodiment of the present invention, both the first brush assembly 450 and the first motor m may be mounted to the lower housing 40.

In addition, one or more second brush assemblies 420 may be provided at a lower portion of the main body 10. As an example, the second brush assemblies 420 may be mounted to the bottom surface of the lower housing 40, and may be spaced apart from each other in the width direction of the main body. In addition, the second brush assemblies 420 may be disposed at a front portion of the bottom surface of the lower housing 40.

The second brush assemblies 420 may be rotated simultaneously with the first brush assembly 450 by rotation of the first motor m. To this end, the driving force from the first motor m may also be transmitted to the second brush assemblies 420 via a connection member such as, for example, helical gears.

The one or more wheels 411, 412, 413 and 414 may include two driving wheels 411 and 412 and two auxiliary wheels 413 and 414.

The driving wheels 411 and 412 may include a right wheel 411 and a left wheel 412, which are spaced apart from each other in the width direction of the main body 10. The auxiliary wheels 413 and 414 may include a front wheel 413 and a rear wheel 414, which are spaced apart from each other in the anterior-posterior direction of the main body 10.

As an example, the one or more wheels 411, 412, 413 and 414 may be formed to protrude downward from the bottom surface of the lower housing 40.

In particular, the two driving wheels 411 and 412 may be respectively connected to second motors M. That is, the right wheel 411 and the left wheel 412 may be respectively connected to each of two second motors M, which are controlled by the control unit C.

When only any one of the right wheel 411 and the left wheel 412 is driven, the robot cleaner 1 may rotate.

For example, when only the second motor M connected to the right wheel 411 is driven, the robot cleaner 1 may rotate to the left. Conversely, when only the second motor M connected to the left wheel 412 is driven, the robot cleaner 1 may rotate to the right.

Although not connected to separate motors, the two auxiliary wheels 413 and 414 may serve to support the movement of the robot cleaner 1 upon operation of the driving wheels 411 and 412.

One or more second cameras 310 may be mounted to the side body 30. As an example, the one or more second cameras 310 may be mounted to the inner surface of the side body 30.

Here, the inner surface of the side body 30 may be a surface facing the interior of the main body 10, and the outer surface of the side body 30 may be a surface facing the exterior of the main body 10.

In addition, the second cameras 310 may be configured to capture images of the region ahead of the robot cleaner 1. The images captured by the second cameras 310 may be transmitted to an external terminal (not illustrated), such as, for example, a smartphone.

In particular, the control unit C may include a communication module (not illustrated), which is configured to communicate with an external terminal, and the images captured by the second cameras 310 may be transmitted to an external terminal through the communication module of the control unit C.

The second cameras 310 may capture images of the region ahead of the robot cleaner 1 through the side body 30. Accordingly, the side body 30 may be formed of a semi-transparent material.

The purpose of this is to enable the second cameras 310 to capture images of the region ahead of the robot cleaner 1, and also to make the interior of the robot cleaner 1 invisible through the side body 30.

The side body 30 may be formed to surround a side portion of the main body 10, and one or more obstacle sensors 340 (refer to FIG. 5) may be mounted to the side body 30, which will be described later.

The obstacle sensors 340 may be mounted to the inner surface of the side body 30.

In addition, one or more sensor covers 320 may be removably mounted to the side body 30, and may be located at positions corresponding to the one or more obstacle sensors 340.

The sensor covers 320 may be removably mounted to the side body 30, and may be located in front of the respective obstacle sensors 340.

That is, each of the sensor covers 320 may be formed to cover the front surface of a corresponding obstacle sensor 340 while being located at a position corresponding to the corresponding obstacle sensor.

At this time, each of the sensor covers 320 and the front surface of the corresponding obstacle sensor 340 may be spaced a predetermined distance apart from each other.

Therefore, the obstacle sensors 340 may be protected by the sensor covers 320. In addition, maintenance and repair of the sensor covers 320 may be easily and conveniently achieved.

In an example, in the case in which the sensor covers 320 are not separately provided, the obstacle sensors 340 may be covered by the side body 30. However, if portions of the side body 30 that correspond to the positions of the obstacle sensors 340 are damaged, for example, scratched, it is probable that the obstacle sensors 340 will malfunction.

Therefore, when it is intended to prevent such malfunction of the obstacle sensors 340, there may occur a problem in that the whole side body 30 must be replaced.

However, the present invention is characterized in that the sensor covers 320, which are located at positions corresponding to the obstacle sensors 340, are removably mounted to the side body 30. Accordingly, the present invention has an advantage in that, even when the sensor covers 320 are scratched, malfunction of the obstacle sensors 340 can be prevented merely by replacing the sensor covers 320.

Hereinafter, the sensor covers 320 of the robot cleaner 1 according to the embodiment of the present invention will be explained in more detail with reference to other drawings.

FIG. 5 illustrates a perspective view of the side body of the robot cleaner according to the embodiment of the present invention.

Referring to FIG. 5, the robot cleaner 1 according to the embodiment of the present invention may include one or more obstacle sensors 340 and one or more sensor covers 320, which are located at positions corresponding to the respective obstacle sensors 340.

As an example, in the embodiment illustrated in FIG. 5, two obstacle sensors 340 and two sensor covers 320 corresponding to the respective obstacle sensors 340 may be disposed at two front corner portions of the side body 30. Accordingly, the two obstacle sensors 340 may detect obstacles located in the range of about 120 degrees to about 180 degrees ahead of the robot cleaner 1.

The obstacle sensors 340 and the sensor covers 320 may be removably mounted to the above-described side body 30.

The sensor covers 320 may be removably mounted to portions of the side body 30 that correspond to the positions of the respective obstacle sensors 340 so as to cover the front surfaces of the respective obstacle sensors 340. At this time, the sensor covers 320 may be mounted to the side body 30 such that the sensor covers 320 are spaced a predetermined distance apart from the front surfaces of the respective obstacle sensors 340.

The sensor covers 320 may serve to protect the obstacle sensors 340 from external shocks, and may also make the obstacle sensors 340 invisible from the outside.

Each of the sensor covers 320 may be formed to have a size suitable for shielding the front surface of a corresponding obstacle sensor 340. This facilitates manufacture and replacement of the sensor covers 320, which will be described later.

That is, each of the sensor covers 320 may be formed to be as small as possible so long as it can sufficiently cover the front surface of a corresponding obstacle sensor 340. Accordingly, when the sensor cover 320 is damaged, for example, scratched, a user may remove the scratched sensor cover 320 from the side body 30, and may easily replace it with a new sensor cover.

As an example, each of the sensor covers 320 may have a height less than or equal to the height of the side body 30. In addition, each of the sensor covers 320 may have a width less than or equal to one-twentieth of the circumference of the side body 30. Preferably, the width of each of the sensor covers 320 may be one-twentieth to one-fiftieth of the circumference of the side body 30.

As such, because the width of each of the sensor covers 320 is much less than the circumference of the side body 30, the scratched sensor cover 320 may be easily replaced, and accordingly the replacement cost may be reduced. In addition, easy replacement of the sensor covers 320 may lead to prevention of malfunction of the obstacle sensors 340.

The side body 30 and the sensor covers 320 may be formed of different materials from each other.

In detail, the side body 30 is formed to cover the front surface of the second cameras 310 for capturing images of the region ahead of the robot cleaner 1. That is, the second cameras 310 may be mounted to the inner surface of the side body 30 so as to capture images of the region ahead of the robot cleaner 1.

Therefore, the side body 30 needs to be formed of a transparent material or a semi-transparent material. In the embodiment of the present invention, the side body 30 may be formed of a semi-transparent material. For example, the side body 30 may be formed of a semi-transparent plastic material.

In other words, the side body 30 may support the second cameras 310 so that the second cameras 310 can be mounted thereto, and may also protect the second cameras 310 from external shocks. In addition, the side body 30 may make the interior of the robot cleaner 1 invisible from the outside.

Unlike this, the sensor covers 320 need to be formed of a material that allows only infrared light to pass therethrough, in order to prevent malfunction of the obstacle sensors 340. For example, the sensor covers 320 may be formed of polycarbonate, which admits only infrared light of direct solar radiation.

In other words, the material used for the sensor covers 320 is more expensive than the material used for the side body 30. Accordingly, if the side body 30 is formed of a semi-transparent plastic material and only the sensor covers 320 are formed of polycarbonate, the manufacturing costs may be reduced further than in the case of the constitution in which the whole side body 30 is formed of polycarbonate.

In addition, as described above, because the material of the side body 30 and the material of the sensor covers 320 are different from each other, it is preferable to manufacture the side body 30 and the sensor covers 320 separately.

In other words, after the side body 30 and the sensor covers 320 are manufactured separately, the sensor covers 320 may be removably mounted to the side body 30 at positions in front of the obstacle sensors 340.

Therefore, manufacturing costs may be reduced, maintenance of the sensor covers 320 may be facilitated, and malfunction of the obstacle sensors 340 may be easily prevented.

Hereinafter, the coupling structure of the sensor covers 320 and the obstacle sensors 340 to the side body 30 and the features of the sensor covers 320 will be explained in more detail with reference to other drawings.

FIG. 6 illustrates an enlarged view of portion A in FIG. 5.

Referring to FIGS. 5 and 6, each of the above-described obstacle sensors 340 may include a light-emitting unit and a light-receiving unit so as to measure the distance to obstacles located ahead of the sensor. For example, each of the obstacle sensors 340 may include an infrared sensor.

The light-emitting unit may emit infrared light toward the region ahead of the robot cleaner, the light-receiving unit may receive the infrared light reflected from an obstacle, and the distance between the infrared sensor and the obstacle may be measured based on the time taken for the infrared light emitted from the light-emitting unit to be received by the light-receiving unit.

At this time, if the light-receiving unit receives light (for example, visible light) other than infrared light, there is a high probability of the obstacle sensor 340 malfunctioning. Therefore, it is necessary to prevent light other than infrared light from being introduced into the light-receiving unit of the obstacle sensors 340.

The sensor covers 320 according to the embodiment of the present invention may be formed to block light other than infrared light. That is, the sensor covers 320 may be formed to block direct solar radiation, such as visible light, other than infrared light.

Accordingly, such sensor covers 320 may prevent malfunction of the obstacle sensors 340 attributable to the introduction of light other than infrared light into the light-receiving unit of the obstacle sensors 340.

In particular, the sensor covers 320 may be formed of polycarbonate. In other words, the sensor covers 320 made of polycarbonate may be removably mounted to the side body 30 made of a semi-transparent plastic material.

The unit price of polycarbonate is higher than that of commonly used semi-transparent plastic, but polycarbonate may serve to easily block light other than infrared light.

By mounting the sensor covers 320 of polycarbonate only to relatively small regions of the side body 30, which correspond to positions in front of the obstacle sensors 340, manufacturing costs may be reduced and malfunction of the obstacle sensors 340 may be prevented.

Meanwhile, if the sensor covers 320 are scratched, there may occur a problem in that the obstacle sensors 340 malfunction due to the scratching.

In order to minimize scratching on the sensor covers 320, at least one surface of each of the sensor covers 320 may be treated with UV coating.

For instance, the surface of each of the sensor covers 320 that is exposed to the outside of the robot cleaner 1 may be treated with UV coating.

Such UV coating treatment may improve the scratch resistance and abrasion resistance of the sensor covers 320, and may also prevent the obstacle sensors 340 from malfunctioning.

Alternatively, all surfaces of each of the sensor covers 320 may be treated with UV coating.

As an example, each of the sensor covers 320 may be formed such that the front surface and the rear surface are symmetrical with each other. This may lead to improvement in efficiency of mounting the sensor covers 320 to the side body 30.

In other words, if each of the sensor covers 320 is formed such that the front surface and the rear surface are symmetrical with each other, there is an advantage in that the sensor covers 320 can be easily mounted to the side body 30 without considering the mounting direction.

In order to maintain the advantage of improving the scratch resistance without considering the orientation at which the sensor covers 320 are mounted to the side body 30, it is preferable to treat all surfaces of the sensor covers 320 with UV coating.

As such, if all surfaces of the sensor covers 320 are treated with UV coating, the scratch resistance of the sensor covers 320 may be improved irrespective of the orientation at which the sensor covers 320 are mounted to the side body 30.

In addition, as illustrated in FIG. 6, the side body 30 may have openings 330 formed therein, each of which is located at a position corresponding to a corresponding obstacle sensor 340 and a corresponding sensor cover 320.

That is, each of the openings 330 may be interposed between a corresponding obstacle sensor 340 and a corresponding sensor cover 320.

Accordingly, each of the obstacle sensors 340 may emit and receive a signal (for example, infrared light) for detecting external obstacles through a corresponding opening 330 and a corresponding sensor cover 320.

In other words, the infrared light generated from the light-emitting unit of each of the obstacle sensors 340 may be emitted outside after sequentially passing through a corresponding opening 330 and a corresponding sensor cover 320, and the infrared light reflected from an obstacle may be received by the light-receiving unit of each of the obstacle sensors 340 after sequentially passing through a corresponding sensor cover 320 and a corresponding opening 330.

The side body 30 may be formed in a hollow ring shape, which has open top and bottom ends and a predetermined height. For example, the side body 30 may be formed in a flat hollow cylindrical shape or a hollow prismatic shape.

The side body 30 may include an inner surface, which faces the interior of the robot cleaner 1, and an outer surface, which faces the exterior of the robot cleaner 1.

It is preferable for the distance between the center in the radial direction of the side body 30 and the outer surface of the side body 30 to be larger than the distance between the center in the radial direction of the side body 30 and the outer surface of each of the sensor covers 320.

In other words, each of the sensor covers 320 may be arranged to be stepped inwards from the outer surface of the side body 30 in the radial direction of the side body 30.

In more detail, each of the sensor covers 320 may be arranged such that the outer surface of each of the sensor covers 320 is stepped toward the interior of the robot cleaner 1 from the outer surface of the side body 30.

Accordingly, the sensor covers 320 may be prevented from directly bumping against obstacles outside the robot cleaner 1. In addition, the sensor covers 320 may be prevented from being scratched.

The side body 30 may further include first coupling portions 331, to which the obstacle sensors 340 are coupled, and second coupling portions 332, to which the sensor covers 320 are coupled.

Each of the first coupling portions 331 may have a coupling protrusion 331', and each of the obstacle sensors 340 may have a coupling recess 341, to which a corresponding first coupling portion 331 is coupled. That is, the coupling protrusion 331' of each of the first coupling portion 331 may be fitted into the coupling recess 341 of a corresponding obstacle sensor 340.

The obstacle sensors 340 may be assembled with the side body 30 toward the exterior in the radial direction of the side body 30 from the interior in the radial direction of the side body 30.

The second coupling portions 332 may be formed in the side body 30 at positions further radially outward than the first coupling portions 331.

Accordingly, when the obstacle sensors 340 and the sensor covers 320 are coupled to the side body 30, the sensor covers 320 may be disposed to cover the front surfaces of the respective obstacle sensors 340.

In addition, the sensor covers 320 may be removably coupled to the second coupling portions 332 in a slide-coupling manner. Accordingly, the coupling and removal of the sensor covers 320 to/from the side body 30 may be facilitated, which leads to easy replacement of the sensor covers 320.

In detail, each of the second coupling portions 332 may be embodied as a slit, which extends in a vertical direction. As an example, each of the second coupling portions 332 may be formed to extend in the vertical direction of the side body 30 in the middle in the thickness direction of the side body 30.

Each of the sensor covers 320 may have an edge portion 322, which is formed in at least one of two opposite side surfaces in the width direction of the sensor cover 320 so as to be inserted into a corresponding second coupling portion 332. As an example, the edge portion 322, which is formed to be inserted into a corresponding second coupling portion 332, may be formed in both side surfaces in the width direction of the sensor cover 320.

In other words, the second coupling portions 332 may be formed by partially cutting the side body 30 in the vertical direction. The sensor covers 320 may be coupled or removed to/from the side body 30 in a manner such that the edge portion 322 of each of the sensor covers 320 slides along a corresponding second coupling portion 332.

Therefore, the sensor covers 320 and the side body 30, which are formed of different materials from each other, may be separately manufactured, and may then be easily coupled to each other.

In addition, since the size of each of the sensor covers 320 is limited to the size that is capable of just barely covering the front surface of a corresponding obstacle sensor 340, an increase in cost attributable to the sensor covers 320, which are formed of a relatively expensive material, may be minimized.

In addition, since only the sensor covers 320 are treated with UV coating, the UV coating process may be facilitated, and the cost of UV coating may be reduced.

Hereinafter, the operational relationship of the components, which are controlled by the control unit C, in the robot cleaner 1 according to the embodiment of the present invention will be explained with reference to other drawings.

FIG. 7 illustrates a block diagram of the components connected with the control unit of the present invention.

Referring to FIG. 7, the above-described control unit C may be electrically connected with the obstacle sensors 340, the first camera 210, and the second cameras 310 so as to control the obstacle sensors 340, the first camera 210, and the second cameras 310 respectively.

The control unit C may also be electrically connected with the first motor m, the second motors M, and the suction device 430 so as to control the first motor m, the second motors M, and the suction device 430 respectively.

For example, when a user inputs an operation signal to the robot cleaner 1, the control unit C may control the suction device 430 and the first motor m so that the suction device 430 and the first motor m are driven to suck foreign substances on the floor into the robot cleaner 1.

In addition, when the images captured by the first camera 210 are transmitted to the control unit C, the control unit C may detect the position of the robot cleaner 1 based on the images captured by the first camera 210.

In addition, based on the signals from the obstacle sensors 340 and the images captured by the first camera 210, the control unit C may selectively drive the second motors M, which are connected to the two driving wheels 411 and 412 respectively.

In addition, the control unit C, which includes the communication module (not illustrated), may receive the images captured by the second cameras 310, and may transmit the images to an external terminal S. For example, the control unit C may transmit the images captured by the second cameras 310 to the external terminal S only when the control unit C receives an image transmission request from the external terminal.

Hereinafter, the above-described suction device 430 will be explained in detail with reference to other drawings.

FIG. 8 illustrates a schematic sectional view of the suction device mounted inside the robot cleaner depicted in FIG. 1, FIGS. 9a and 9b illustrate perspective views respectively showing a suction motor and a fan cover of the suction device, and FIG. 10 illustrates a view showing the motor of the suction device depicted in FIG. 8 in detail.

Referring to FIGS. 8 to 10, the above-described suction device may include a suction motor 500 and a suction fan 600.

The suction fan 600 may be rotated by the operation of the suction motor 500. That is, the suction fan 600 may be formed so as to be rotated according to the rotation of a rotating shaft 530 of the suction motor 500. In addition, the suction motor 500 may be controlled by the above-described control unit C.

In an example, the suction motor 500 may include a stator 510 and a rotor 520, which is disposed around the stator 510 and is formed so as to be rotated with the rotating shaft 530. In order to be rotated with the rotor 520, the rotating shaft 530 may be forcibly fitted into a portion of the rotor 520.

The rotor 520 may include a first magnet 521, which is provided to rotate the rotor 520 around the stator 510, and a second magnet 522, which is provided to prevent the rotating shaft 530 of the suction motor 500 from moving axially within the range of end play.

In particular, the rotor 520 may be formed to surround the lateral portion and the front portion of the stator 510. The stator 510 may be provided with a stator coil 511 (refer to FIG. 10), which is formed to receive electric current from an external power source.

The rotor 520 may be rotated by the electromagnetic force generated between the first magnet 521 and the stator coil 511.

Upon rotation of the rotor 520, the rotating shaft 530 and the suction fan 600, coupled to the rotating shaft 530, are rotated together. Upon rotation of the suction fan 600, external air may be sucked from the region ahead of the suction fan 600 toward the region behind the suction fan 600.

In particular, the suction fan 600 may include a fan body 610 and a plurality of blades 620, which are formed on the fan body 610 and are arranged in the circumferential direction of the fan body 610. In addition, the suction fan 600 may be formed with an insertion hole 630, into which the rotating shaft 530 is inserted.

The rotating shaft 530 may be forcibly fitted into the insertion hole 630, and the outer circumferential surface of the rotating shaft 530 and the inner circumferential surface of the insertion hole 630 may be bonded to each other.

Therefore, when the suction fan 600 is rotated by rotation of the rotating shaft 530, external air may be sucked from the region ahead of the suction fan 600 toward the suction motor 500 in the direction of the arrow B illustrated in FIG. 8.

At this time, the rotation of the suction fan 600 may generate thrust that is directed in the forward direction of the suction fan 600, and the thrust may be applied to the rotating shaft 530 coupled to the suction fan 600 (refer to the arrow A in FIG. 8).

In the case in which the rotor 520 is not provided with the second magnet 522, if the thrust is applied to the rotating shaft 530, the rotating shaft 530 and the suction fan 600 coupled to the rotating shaft 530 may move axially within the range of end play of the rotating shaft 530 in the forward direction of the suction motor 500.

The maximum value of the distance that the rotating shaft 530 moves axially in the forward direction of the suction motor 500, depending on the magnitude of the thrust, corresponds to the end play of the rotating shaft 530.

Meanwhile, referring to FIG. 9, a fan cover 690 may be mounted in front of the suction fan 600 so as to guide external air to flow toward the suction fan 600. The fan cover 690 may be formed to surround at least a portion of the suction fan 600. In addition, the fan cover 690 may have a guide hole 692 formed to guide external air to flow toward the suction fan 600.

The fan cover 690 may be coupled to a motor housing 590. In an example, the fan cover 690 may have a first fastening hole 691 formed therein, and the motor housing 590 may have a second fastening hole 591 formed so as to correspond to the first fastening hole 691.

If the suction fan 600 moves within the range of end play of the rotating shaft 530 in the forward direction of the suction motor 500, the distance between the suction fan 600 and the inner circumferential surface of the fan cover 690 may be changed from a distance G that has been predetermined for optimum suction efficiency in the design process.

That is, due to the rotation of the suction fan 600, the distance between the suction fan 600 and the inner circumferential surface of the fan cover 690 may become shorter than the predetermined distance G.

If the distance between the suction fan 600 and the fan cover 690 becomes shorter than the predetermined distance G, the dispersion of suction force by the rotation of the suction fan 600 may occur.

In order to prevent or reduce such dispersion of suction force, there is a need to prevent the rotating shaft 530 from moving axially within the range of end play while the suction fan 600 rotates.

To this end, the rotor 520 of the suction motor 500 may include a first magnet 521 for rotating the rotor 520, and a second magnet 522 for preventing the rotating shaft 530 from moving axially within the range of end play.

The first magnet 521 and the second magnet 522 may be provided independently from each other in the rotor 520. In addition, the first magnet 521 and the second magnet 522 may be located at different positions in the rotor 520.

In particular, the rotor 520 may have a first mounting surface 501 and a second mounting surface 502, to which the first magnet 521 and the second magnet 522 are mounted.

In an example, the first magnet 521 may be mounted to the first mounting surface 501, and the second magnet 522 may be mounted to the second mounting surface 502 (refer to FIG. 8). In addition, the first mounting surface 501 and the second mounting surface 502 may be arranged perpendicular to each other.

In more detail, referring to FIG. 10, the rotor 520 may include a front plate 525, into which the rotating shaft 530 is forcibly fitted, and a cylindrical-shaped side plate 527, which extends from the front plate 525. The front plate 525 and the side plate 527 may be integrally formed.

The first magnet 521 may be disposed on the side plate 527, and the second magnet 522 may be disposed on the front plate 525.

The first magnet 521 may be mounted to the side plate 527 at a position corresponding to the stator coil 511 of the stator 510 while opposing the stator 510. That is, the first magnet 521 may be mounted to the inner surface of the side plate 527 at a position corresponding to the stator coil 511.

The second magnet 522 may be mounted to the front plate 525 at a position corresponding to the stator coil 511 of the stator 510 while opposing the stator 510. That is, the second magnet 522 may be mounted to the inner surface of the front plate 525 at a position corresponding to the stator coil 511.

Accordingly, the rotor 520 may be rotated by the electromagnetic force generated between the first magnet 521 and the stator 510.

When the above-described thrust is applied to the rotating shaft 530, which makes the rotor 520 coupled to the rotating shaft 530 move in the forward direction of the suction motor 500, the electromagnetic force generated between the first magnet 521 and the stator 510 may serve to pull the rotor 520 in the rearward direction of the suction motor 500.

The reason for this is that, if the first magnet 521 and the stator 510, which were originally arranged at positions corresponding to and opposite each other, are misaligned, the electromagnetic force between the first magnet 521 and the stator 510 may serve as a force that makes the first magnet 521 and the stator 510 return to their original mutually corresponding positions.

Hereinafter, for convenience of explanation, force generated by the electromagnetic force between the first magnet 521 and the stator coil 511, which pulls the rotor 520 and the rotating shaft 530 in the rearward direction of the suction motor 500, will be referred to as "first restoring force".

That is, when the thrust makes the rotating shaft 530 move axially within the range of end play in the forward direction of the suction motor 500, the first restoring force may be applied to the rotating shaft 530 so that the rotating shaft 530 is pulled in the rearward direction of the suction motor 500.

In addition, due to the electromagnetic force generated between the second magnet 522 and the stator coil 511 of the stator 510, force directed in the rearward direction of the suction motor 500 may be applied to the rotating shaft 530.

That is, the second magnet 522 may be pulled toward the stator coil 511 by the electromagnetic force generated between the second magnet 522 and the stator coil 511. At this time, the rotor 520, to which the second magnet 522 is mounted, and the rotating shaft 530 secured to the rotor 520 may also be pulled in the rearward direction of the suction motor 500.

Hereinafter, for convenience of explanation, force generated by the electromagnetic force between the second magnet 522 and the stator coil 511, which pulls the rotor 520 and the rotating shaft 530 in the rearward direction of the suction motor 500, will be referred to as "second restoring force".

The second restoring force may be constantly applied to the components irrespective of whether the rotating shaft 530 moves axially. That is, because the second magnet 522 and the stator coil 511 face each other irrespective of the axial movement of the rotating shaft 530, the second restoring force may always act between the second magnet 522 and the stator coil 511.

Described in detail, the direction of the thrust applied to the rotating shaft 530 upon rotation of the suction fan 600 may be opposite to the direction of the first restoring force, which is applied to the rotating shaft 530 due to the electromagnetic force between the first magnet 521 and the stator coil 511, and may also be opposite to the direction of the second restoring force, which is applied to the rotating shaft 530 due to the electromagnetic force between the second magnet 522 and the stator coil 511.

That is, the thrust may be force that is directed in the forward direction of the suction motor 500, and the first restoring force and the second restoring force may be forces that are directed in the rearward direction of the suction motor 500.

For example, the thrust may be force that acts in the direction of the arrow A in FIG. 8. The first restoring force may be force that acts in the direction of the arrow D in FIG. 10. The second restoring force may be force that acts in the direction of the arrow E in FIG. 10.

The thrust applied to the rotating shaft 530 upon rotation of the suction fan 600 may be less than or equal to the sum of the first restoring force and the second restoring force.

Accordingly, although the thrust is applied to the rotating shaft 530 upon rotation of the suction fan 600, the rotating shaft 530 may be prevented from moving axially within the range of end play.

The distance between the suction fan 600 and the inner circumferential surface of the fan cover 690 may be maintained at a predetermined distance G. That is, the dispersion of suction force of the suction device 430 may be prevented or reduced.

The number of second magnets 522 mounted to the rotor 520 may be one or more. At least one of the size and the number of second magnets 522 mounted to the rotor 520 may be determined based on the required restoring force.

In particular, at least one of the size and the number of second magnets 522 may be determined such that the second restoring force between the second magnet 522 and the stator coil 511 is greater than or equal to the value calculated by subtracting the first restoring force from the thrust.

That is, the end play of the suction motor 500 may vary depending on the type of suction motor 500 and the mounting structure of the suction motor 500, and at least one of the number and the size of second magnets 522 may vary depending on the end play of the suction motor 500.

Due to the above-described second magnet 522, irrespective of rotation of the suction fan 600, the distance between the inner circumferential surface of the fan cover 690 and the free end portion of the suction fan 600, which faces the inner circumferential surface of the fan cover 690, may be maintained at a predetermined distance G.

That is, when the suction fan 600 rotates upon operation of the suction motor 500, the distance between the inner circumferential surface of the fan cover 690 and the end portion of each of the blades 620 of the suction fan 600, which faces the inner circumferential surface of the fan cover 690, may be maintained at a predetermined distance G.

In other words, although the suction device is constituted such that the rotating shaft 530 of the suction motor 500, which is a small motor, is able to move axially within the range of end play, the electromagnetic force between the second magnet 522 and the stator coil 511 may prevent the rotating shaft 530 from moving axially within the range of end play in the forward direction of the suction motor 500.

In addition, since the distance between the inner circumferential surface of the fan cover 690 and the free end portion of the suction fan 600, which faces the inner circumferential surface of the fan cover 690, is maintained at a predetermined distance G irrespective of rotation of the suction fan 600, the dispersion of suction force may be prevented or reduced.

INDUSTRIAL APPLICABILITY

The present invention provides a robot cleaner that is capable of reducing the dispersion of suction force by preventing a rotating shaft from moving axially within the range of end play while a fan of a suction device rotates, of preventing an obstacle sensor from malfunctioning, and of improving the precision of obstacle detection.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A robot cleaner comprising:
   a main body defining an outer appearance thereof;
   a suction device mounted inside the main body and including a suction motor and a suction fan;
   a fan cover mounted in front of a suction fan and having a guide hole formed to guide air to flow toward the suction fan;
   a suction port for sucking foreign substances from a floor upon operation of the suction device;
   a dust collection device for collecting the foreign substances from air sucked through the suction port;
   one or more wheels for enabling the main body to travel autonomously; and
   a control unit for controlling operation of the suction device and the wheels,
   wherein the suction motor includes a stator, and a rotor provided around the stator and formed to be rotated with a rotating shaft,
   wherein the rotor includes a first magnet for rotating the rotor around the stator, a second magnet for preventing an end of the rotating shaft of the suction motor from moving axially within a particular range of positions, a front plate formed to allow the rotating shaft to be forcibly fitted thereinto, and a cylindrical-shaped side plate extending from the front plate,
   wherein the first magnet is provided on the side plate, and the second magnet is provided on the front plate,
   wherein the second magnet is mounted to the front plate at a position corresponding to a stator coil of the stator and opposing the stator,
   wherein the rotating shaft receives force directed in a rearward direction of the suction motor via the front plate due to electromagnetic force generated between the second magnet and the stator coil of the stator, and
   wherein force directed in the rearward direction of the suction motor causes a distance between an inner circumferential surface of the fan cover and a free end portion of the suction fan facing the inner circumferential surface of the fan cover to be maintained at a prescribed distance.

2. The robot cleaner according to claim 1, wherein the first magnet and the second magnet are provided independently from each other in the rotor, and
   the rotor has a first mounting surface for mounting the first magnet thereto and a second mounting surface for mounting the second magnet thereto, the first mounting surface and the second mounting surface being arranged perpendicular to each other.

3. The robot cleaner according to claim 1, wherein a direction of thrust applied to the rotating shaft upon rotation of the suction fan is opposite to a direction of first restoring force applied to the rotating shaft due to electromagnetic force between the first magnet and the stator coil and is opposite to a direction of second restoring force applied to the rotating shaft due to electromagnetic force between the second magnet and the stator coil.

4. The robot cleaner according to claim 3, wherein the thrust is less than or equal to a sum of the first restoring force and the second restoring force.

5. The robot cleaner according to claim 4, wherein at least one of a size or a number of the second magnet is determined such that the second restoring force between the second magnet and the stator coil is greater than or equal to a value calculated by subtracting the first restoring force from the thrust.

6. The robot cleaner according to claim 1, wherein the main body includes an upper housing and a lower housing, the upper housing and the lower housing being coupled to each other, and a side body interposed between the upper housing and the lower housing to surround a side portion of the main body, the side body being mounted with one or more obstacle sensors, and one or more sensor covers are removably mounted to the side body at positions corresponding to the one or more obstacle sensors.

7. The robot cleaner according to claim 6, wherein each of the sensor covers has a height less than or equal to a height of the side body, and has a width less than or equal to one-twentieth of a circumference of the side body.

8. The robot cleaner according to claim 6, wherein the side body and the sensor covers are formed of different materials from each other.

9. The robot cleaner according to claim 8, wherein the side body and the sensor covers are manufactured separately, and the sensor covers are removably mounted to the side body at positions in front of the obstacle sensors.

10. The robot cleaner according to claim 8, wherein each of the obstacle sensors includes an infrared sensor, and the sensor covers are formed of polycarbonate so as to block light other than infrared light.

11. The robot cleaner according to claim 10, wherein at least one surface of each of the sensor covers is treated with UV coating.

12. A suction motor comprising:

a stator having a stator coil;

a cylindrical-shaped rotor formed to be rotated with a rotating shaft around the stator, and a suction fan coupled to the rotating shaft, wherein the rotor is formed to surround a lateral portion and a front portion of the stator, wherein the rotor includes a first magnet for rotating the rotor around the stator, a second magnet for preventing an end of the rotating shaft of the suction motor from moving axially within a particular range of positions, a front plate formed to allow the rotating shaft to be forcibly fitted thereinto, and a cylindrical-shaped side plate extending from the front plate, wherein the first magnet is provided on the side plate and the second magnet is provided on the front plate, wherein the second magnet is mounted to the front plate at a position corresponding to the stator coil of the stator and opposing the stator, and the rotating shaft receives force directed in a rearward direction of the suction motor via the front plate due to an electromagnetic force generated between the second magnet and a stator coil of the stator.

13. The suction motor according to claim 12, wherein the first magnet and the second magnet are provided independently from each other in the rotor, and the rotor has a first mounting surface for mounting the first magnet thereto and a second mounting surface for mounting the second magnet thereto, the first mounting surface and the second mounting surface being arranged perpendicular to each other.

14. The suction motor according to claim 12, wherein a direction of thrust applied to the rotating shaft upon rotation of the suction fan is opposite to a direction of first restoring force applied to the rotating shaft due to electromagnetic force between the first magnet and the stator coil and is opposite to a direction of second restoring force applied to the rotating shaft due to electromagnetic force between the second magnet and the stator coil.

15. The suction motor according to claim 14, wherein the thrust is less than or equal to a sum of the first restoring force and the second restoring force.

\* \* \* \* \*